US012732551B1

(12) United States Patent
Politis

(10) Patent No.: US 12,732,551 B1
(45) Date of Patent: Sep. 8, 2026

(54) DATA-COMMUNICATION APPARATUSES AND METHODS INVOLVING RELEVANCE BASED NETWORK QUEUING

(71) Applicant: 8x8, Inc., Campbell, CA (US)

(72) Inventor: Georgios Politis, London (GB)

(73) Assignee: 8x8, Inc., Campbell, CA (US)

(*) Notice: Subject to any disclaimer, the term of this patent is extended or adjusted under 35 U.S.C. 154(b) by 58 days.

(21) Appl. No.: 18/812,231

(22) Filed: Aug. 22, 2024

(51) Int. Cl.
*H04L 65/403* (2022.01)
*G06F 40/30* (2020.01)
*H04L 69/164* (2022.01)

(52) U.S. Cl.
CPC ............ *H04L 65/403* (2013.01); *G06F 40/30* (2020.01); *H04L 69/164* (2013.01)

(58) Field of Classification Search
CPC ...... H04L 65/403; H04L 69/164; G06F 40/30
USPC .......................................................... 709/204
See application file for complete search history.

(56) References Cited

U.S. PATENT DOCUMENTS 7,769,028 B2 8/2010 Boley et al.
7,856,012 B2 12/2010 Smith et al.
8,204,206 B2 6/2012 Townsend et al.
9,712,570 B1 7/2017 Ivov et al.
9,935,857 B1 4/2018 Liu et al.
11,240,370 B1 2/2022 Liu et al.
11,425,252 B1 8/2022 Martin et al.
11,483,170 B1 * 10/2022 Carbune ............. H04L 12/1822
11,539,842 B2 12/2022 Southwick et al.
11,902,470 B1 2/2024 Smith-Mickelson et al.
12,022,028 B1 6/2024 Southwick et al.
2012/0173478 A1 * 7/2012 Jensen .................. G06F 16/283 707/602

(Continued)

FOREIGN PATENT DOCUMENTS

WO 2022/256028 A1 12/2022

OTHER PUBLICATIONS

Grozev, Boris, et al. "Last N: relevance-based selectivity for forwarding video in multimedia conferences." Proceedings of the 25th ACM Workshop on Network and Operating Systems Support for Digital Audio and Video, 2015, pp. 19-24.

(Continued)

*Primary Examiner* — Zi Ye
(74) *Attorney, Agent, or Firm* — Vista IP Law Group, LLP

(57) ABSTRACT

In one non-limiting example a computer-implemented server method involves receiving data-communication packets from a plurality of user-operable endpoints in a data-communications conference, and accounts for relevance of the packets for a particular data-communications conference (or meeting) and for system-based communications constraints before assigning and mapping a ranking value to the packets at an application layer of a communications network protocol. The ranking value of the packets at the application layer is then used to set a priority of the received packets for transmission to the participant of the meeting, for example, by a media server (e.g., relevance-based smart server) which is configured with access to moderator- or algorithm (e.g., adapted ML/AI algorithm) provided data about the conference in real-time (or near real-time) including contextually relevant datasets custom to a specific application/service of a software platform (e.g., cloud-based communications platform).

20 Claims, 3 Drawing Sheets

(56) References Cited

U.S. PATENT DOCUMENTS

2013/0176910 A1* 7/2013 Gorti .................. H04L 65/4038 370/260
2018/0097863 A1 4/2018 Ivov et al.
2018/0132037 A1* 5/2018 McGibney ................ H04S 3/00
2022/0303205 A1* 9/2022 Narula ................ H04L 43/0894
2023/0297417 A1* 9/2023 Ali .......................... G06F 3/067 718/102

OTHER PUBLICATIONS

W3C®. WebRTC Priority Control API: W3C Candidate Recommendation Snapshot, Mar. 18, 2021, 9 pgs. https://www.w3.org/TR/2021/CR-webrtc-priority-2021031.
GitHub, Inc. "Jitsi Videobridge" https://github.com/jitsi/jitsi-videobridge; and 8x8, Inc. "Jitsi Videobridge Open Source Video Conferencing for Developers" https://jitsi.org/jitsi-videobridge/. printed Aug. 1, 2024, 5 pgs.

* cited by examiner

DATA-COMMUNICATION APPARATUSES AND METHODS INVOLVING RELEVANCE BASED NETWORK QUEUING

BACKGROUND

Aspects of the present disclosure are related generally to the field of data-communication systems and more particularly to conferencing via data-communication systems.

There are numerous data streams to process when presenting a video conference/electronic meeting including video streams, audio streams, etc. Using video conferencing as one such type of conferencing technology for ease of discussion, it has been appreciated that one of the most important aspects in video conferencing is video quality. Optimizing video quality has been an active research topic in recent years. There are many sophisticated techniques that can be used to optimize video quality in the application layer. However, examples of such techniques are sub-optimal in that they can experience bandwidth and latency issues especially when electronic meetings have a large number of participants and there are multiple different types of data streams to process. For example, in a layered network-communication model such as the Open Systems Interconnection (OSI) model, this is partly because there is a lack of synergy between packet routing in the network layer and other layers of the OSI model, including the application layer, with respect to routing of meeting data. Furthermore, meeting context can change depending on various factors including the type of application/service used for hosting and also meeting-specific factors such as changing participants and changing agendas, are not accounted for in traditional packet routing, and this can exasperate the lack of synergy for packet routing in the network layer and other OSI layers.

SUMMARY OF VARIOUS ASPECTS AND EXAMPLES

Various examples/embodiments presented by the present disclosure are directed to issues such as those addressed above and/or others which may become apparent from the following disclosure. For example, some of these disclosed aspects are directed to methods and devices that control data feeds for a particular conference by using or leveraging from knowing, predicting and/or discerning specific information about the particular conference (e.g., what data is to be sent, who is involved in sending such data, whether data to be shared in the conference is medium-to-large sized data, etc.) and, in response, controlling the data feeds to optimize the particular conference.

In one example according to the present disclosure, a computer-implemented server method involves receiving data-communication packets from a plurality of user-operable endpoints in a data-communications conference, and accounts for relevance of the packets for a particular data-communications conference (or meeting) and for system-based communications constraints before assigning and mapping a ranking value to the packets at an application layer of a communications network protocol. The ranking value of the packets at the application layer is then used to set a priority of the received packets for transmission to the participant of the meeting, for example, by a media server (e.g., relevance-based smart server) which is configured with access to moderator- or algorithm provided data about the conference.

In one specific example, a method involves the steps of receiving data-communication packets from a plurality of user-operable endpoints in a data-communications conference, and then for one or more application data endpoints (e.g., user-operable endpoints) in the data-communications conference assigning a ranking value, and mapping the ranking value at an application layer of a communications network protocol to an appropriate packet marking before causing the data-communication packets to be conveyed during the data-communications conference. The step of receiving the data-communication packets from a plurality of user-operable endpoints in a data-communications conference may be a media server (e.g., relevance-based smart server) which is configured with access to data about one or more of the conference participants, the communications circuits to be used in the conference, and the network. The assigning of the ranking value is one from among different possible ranking values to different sets of data-communication packets respectively received from different ones of the plurality of user-operable endpoints. The ranking values include at least one higher value and a plurality of lower values, based on: a determined relevance of certain of the data-communication packets of one of the plurality of user-operable endpoints; and on one or more constraints associated with the data-communications conference. The ranking value is mapped to an appropriate IP packet prioritization header that is added (or updated) to the outgoing packet at the more general layer (e.g., network layer), and in response, this causes the ranked data-communication packets to be sent during the data-communications conference with higher network queueing priority—and therefore higher reliability and less latency—than another of the different sets of data-communication packets.

In other specific examples related to the above methodology, the present disclosure is directed to apparatuses, such as systems, having a media server to receive data-communication packets from a plurality of user-operable endpoints in a data-communications conference. In such examples, the apparatus or system also includes computing-processor circuitry, linked with the media server, to assign a ranking value and to map the ranking value. The ranking value is from among possible ranking values including at least one higher value and a plurality of lower values, and is assigned based on a determined relevance of certain of the data-communication packets of one of the plurality of user-operable endpoints and on one or more constraints (e.g., one or more constraints from among: jitter, bandwidth of the media server, and bandwidth of at least one of the different ones of the plurality of user-operable endpoints) associated with the data-communications conference, with the ranking value being assigned to different sets of data-communication packets respectively received from different ones of the plurality of user-operable endpoints. The ranking value is mapped at an application layer of a communications network protocol to an appropriate IP packet (e.g., IP packet prioritization header) at the network layer, and in response, said certain of the data-communication packets are caused to be conveyed (or transmitted) during the data-communications conference with more urgency than another of the different sets of data-communication packets respectively received from different ones of the plurality of user-operable endpoints.

In yet other specific examples, the present disclosure is directed for use with a data communications system having a media server that is to receive data-communication packets from a plurality of user-operable endpoints in a data-communications conference. The data communications system includes computing-processor circuitry to: analyze content of the received data-communication packets; discern a determined relevance of certain of the data-communication packets of one of the plurality of user-operable endpoints based on the analyzed content; assign a ranking value; and mapping the ranking value at an application layer of a communications network protocol to an appropriate IP packet (e.g., IP packet prioritization header) at the network layer. The ranking value is assigned from among different possible ranking values (e.g., upper, middle and lower values) based on a determined relevance of certain of the data-communication packets of one of the plurality of user-operable endpoints and on one or more constraints associated with the data-communications conference, to different sets of data-communication packets respectively received from different ones of the plurality of user-operable endpoints. In response to mapping, the aforesaid certain of the data-communication packets are to be conveyed during the data-communications conference with more urgency than another of the different sets of data-communication packets respectively received from different ones of the plurality of user-operable endpoints.

In more specific examples, one or more of the above aspects and embodiments (e.g., as a method and/or apparatus) may be modified in various ways. For example, with respect to the mapping, the mapping may occur before the certain of the data-communication packets are caused to be conveyed or sent, and such sending may occur during the data-communications conference via user datagram protocol (UDP) type data transfer protocol. As other examples, such methodology or configuration of the media server/computer processing circuitry may include discerning at least one of, or at least two or more of: the determined relevance of certain of the data-communication packets of one of the plurality of user-operable endpoints, and the one or more constraints associated with the data-communications conference, and so discerning based on aspect(s) such as context, emotion or sentiment, and one or more keywords used by the received data-communication packets.

In yet other specific examples building on one or more of the other examples and aspects herein, the method or apparatus may involve or include discerning the determined relevance of certain of the data-communication packets by a computer-executed algorithm that predicts, via artificial intelligence or machine learning, the determined relevance of at least one of the data-communication packets from an associated one of the plurality of user-operable endpoints. Also, discerning the determined relevance of certain of the data-communication packets may be realized based on an input data that is derived from communications that are internal to the data-communications conference or from an external feed provided from a source outside of the data-communications conference. Further, such additional aspects may involve or include weighting the determined relevance of certain of the data-communication packets of one of the plurality of user-operable endpoints as a function of the one or more constraints associated with the data-communications conference.

In certain other more specific embodiments, the data-communications conference is at least one of a video-based conference and a chat-based conference, and for the chat-based conference each of the received data-communication packets is received via a disparate one of at least three disparate chat-communication platforms respectively linked and characterized by different chat-based communication protocols.

The above discussion is not intended to describe each aspect, embodiment or every implementation of the present disclosure. The figures and detailed description that follow also exemplify various embodiments.

BRIEF DESCRIPTION OF FIGURES

Various example embodiments, including experimental examples, may be more completely understood in consideration of the following detailed description in connection with the accompanying drawings, each in accordance with the present disclosure, in which.

Figure 1:
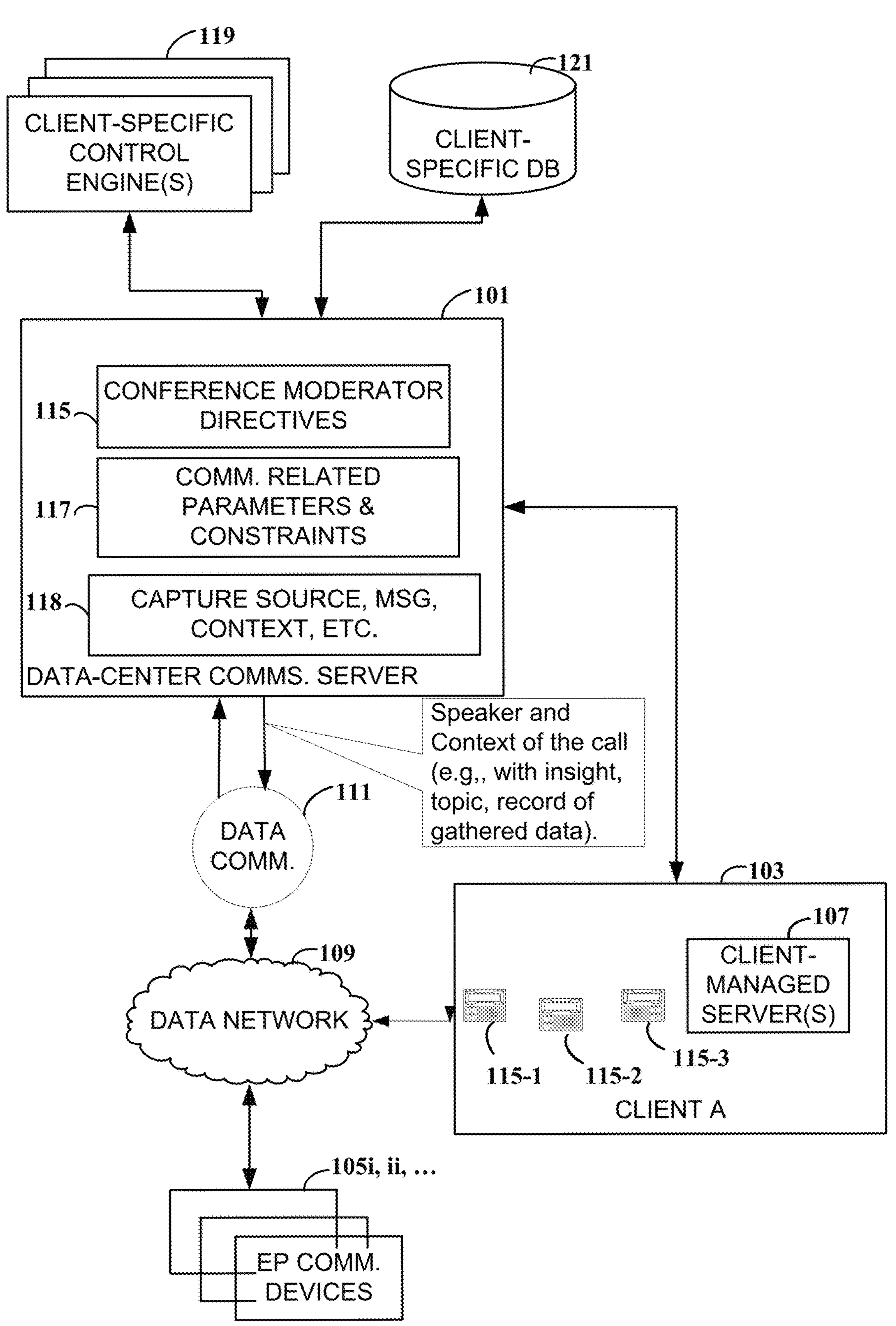
FIG. 1 is a schematic diagram representing data-communications systems configured for prioritizing incoming data communications, according to certain exemplary aspects of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving communication platforms and devices in a meeting such as one based on participants establishing a communications channel with a server, as may be implemented by one or more cooperatively-operated data-communication servers whether configured in the Cloud (e.g., servers implemented remotely via Internet operating on the World Wide Web), and/or located at or nearby a location of a client entity registered to receive data communications services from the server. While many examples of the present disclosure may be conveyed using a video conference (or electronic meeting) as the form of the conference or meeting, the present disclosure is not necessarily limited to such aspects and this should be appreciated in connection with the following discussion and various specific examples in the following description. While examples may reference video streams as an exemplary data stream, this is done for ease of discussion. It is to be recognized that examples described herein can be applied to any type of data stream being processed during a video conference/electronic meeting.

Accordingly, in the following description various specific details are set forth to describe specific examples presented herein. It should be apparent to one skilled in the art, however, that one or more other examples and/or variations of these examples may be practiced without all the specific details given below. In other instances, well-known features have not been described in detail so as not to obscure the description of the examples herein. For ease of illustration, the same connotation and/or reference numerals may be used in different diagrams to refer to the same elements or additional instances of the same element. Also, although aspects and features may in some cases be described in individual figures, it will be appreciated that features from one figure or an embodiment can be combined with features of another figure or embodiment even though the combination is not explicitly shown or explicitly described as a combination.

Exemplary aspects of the present disclosure are directed to relevance-based network queuing-type process to prioritize IP (Internet Protocol) packets conveyed to and/or from different participants involved a data communications conference (e.g., a chat conference or a videoconference) being serviced from a media server. For instance, a media server would use a queuing-type process for providing data to the target participants of a videoconference. However, given that humans may prefer to intake a single stream or less than a few-to-several video streams (or other types of data streams) at a time, according to the present disclosure, the videoconference is benefited or optimized by prioritizing the IP packets based on different types of relevance-related aspects and/or system-related communications constraints that may impact, or are predicted to impact, the videoconference.

Consistent with the present disclosure and again using a videoconference as an example, such devices and/or methods may use an algorithm that optimizes the quality (e.g., objectively assessed or predicted) of the most relevant and/or important A/V stream based on: meeting-related information such as who is speaking, the last-N speakers (e.g., where N is 1, 2, or 3), who is currently on stage, who is the author of the material currently being presented, who is the author of the material to be presented, who is participating in screen-sharing, what is the file size of the material to be presented, and what is or are the resolution parameter(s) of the meeting communication (e.g., video) elements). The quality of the videoconference is controlled and optimized by considering and reacting to one or more constraints (e.g., bandwidth of the devices involved at either end of the media server, quality of the network connections (noise, jitter, delays, etc.) associated with the equipment used to carry out the data-communications conference. This equipment and the related constraints may be due to the user endpoints devices ("EPs" such as smart phones, IP-communications enabled CPUs, tablets, etc.).

Another example of a communications-related constraint pertains to microphone feedback from a conference participant, which can adversely affect the quality of the videoconference. This may be a problem even when the conference participant is deemed to be a very important participant for the conference and having high priority set for whenever this participant is speaking (e.g., moderator or high-level officer of an entity involved in the conference). If such a conference participant is unknowingly creating microphone feedback while speaking and this feedback is blocking the ability of most or all the other conference participants from understanding what is being shared, the monitoring aspect of the media server can address the problem by temporarily adjusting the priority value assigned to the very important conference participant to permit an alert to be communicated selectively to this very important conference participant, so that the very important conference participant can manually address the problem and/or by automatically enabling a designated colleague of the very important conference participant to share information that overrides the relevance and assigned priority of the very important conference participant until the issue is resolved (e.g., manually or automatically such as by the relevant EP).

For queueing purposes, according to the present disclosure, the priority of the IP packets of a video stream V in this videoconference-type context may be a function of the relevance R of the IP packets and also a function of communications-related constraints of the system aspects involved in conveying the IP packets from the source to the EP(s). Typically these system aspects include the source EP sending the IP packets, the targeted EP(s) to receive the IP packets, and the media server. This priority P may be expressed as a mapping for queueing as a function of the relevance R and of at least one communications-related constraint C as follows:

$$P: R \times C \rightarrow \{P_1, P_2, \ldots, P_N\}.$$

In a more complex context, the relevance R and of at least one communications-related constraint C may be weighted with a given weighting (increasing or decreasing) value by one or more factors. Such factors may be, as examples, a degree or noise between the sourcing EP and media server and/or between the media server and the sourcing EP, or bandwidth limitations (e.g., on an important EP that is targeted to receive the packets or video stream). As examples, a constraint C may be weighted with a decreasing weighting value (e.g., n/5 where n is an integer not greater than 4) such that by applying the weighting value to the relevance value that would otherwise be assigned to a set of packets, the resulting relevance value is decreased by that amount. In other situations, constraint C may be weighted with an increasing weighting value such as when the constraint is a future network-communications problem (e.g., predicted by an AI engine as part of the media server) which could be overcome when the relevance of the set of packets is relatively high, the size of the file related to the packets is large and by providing the received packets with a higher priority assignment would cause the packets to be sent before the predicted problem may impact the broadcasting of the file for the conference participants.

Accordingly and consistent with some of the above characterizations, certain exemplary aspects of the present disclosure involve methodology and structures directed to determining a relevance of certain of the data-communication packets (e.g., by a computer-executed algorithm that predicts, via adapted AI/ML (artificial intelligence and/or machine learning) that is customized for application-specific processing). The determined relevance of the data-communication packet(s) may be based upon content, timing and/or source of the data packets as identified from an associated one of the plurality of user-operable endpoints. For example, an attachment or shared document to be used at the outset of a particular conference and having the term "Meeting Agenda" may be discerned or pre-conference designated to have the highest priority (among the available priority designations) if shared by the conference moderator within the first 15 minutes of the conference or if shared after participants' discussion pertaining to a single topic that ensues for more than 15 minutes. Similarly, after the first 10 minutes of the conference, the first spoken words of the highest-ranking employee of a client entity linked to the moderator may be deemed to be given a relatively high level of priority. This relevance, in each instance, may be determined in one or more different ways such as by an algorithm executed by a computer-based data processing circuit integrated with the media server that monitors the content of the conference, by accessing a database of instructions which are driven by historical (learned) data, and/or by a moderator or other representative designated for providing instructions for the conference.

Also, the determined relevance of the data-communication packets may be based on an input data that is derived from communications that are internal to the data-communications conference or from an external feed provided from a source outside (e.g., an alert or an important news feed) of the data-communications conference. For example, an internal or external feed may be used to effectively interrupt the conference to convey urgent news or an alert specific to the conference or to a client entity (e.g., an individual, a company, or an organized group of individuals registered with the service provider of the data communications services effecting the conference). Also, the alert or news may be to inform of the execution of an important agreement, approval, rejection or sale pertaining to the client entity and causing the topic for the conference to change or the need for the conference to terminate or be rendered moot.

In a typical video conference according to the present disclosure, on top of the packet routing that happens at the network layer, video streams are routed in the application layer as well. In one exemplary manner, the application layer video routing works by carrying out the following actions. First, each participant s sends a set of video streams Vs to the media router. Next, for each receiving participant r and for every video stream v in the set of all video streams of all other participants $\{v \in V_p | p \neq r\}$ the relevance-based smart Selective Forwarding Unit (SFU, a.k.a. an adapted video router) produces a relevance rank $R_v$ representing the relative relevance of the video stream v for the receiving participant r. The relevance rank $R_v$ can be computed based on one or more of a variety of factors, examples of which include: the screen layout, screen dimensions, what is displayed on-stage, who is the active speaker, who were the last N active speakers (N being a positive integer), the available bandwidth, the client workload, the video router workload, etc. The relevance-based smart SFU selectively forwards the set of video streams that are the most relevant for the receiving participant r.

At the network layer, there are various congestion control mechanisms that prioritize certain IP packets based on their markings. Such prioritization mechanisms can improve latency and reduce packet loss of appropriately marked IP packets, which improves video quality and user experience.

In a more specific example, the network and application layers are defined via one or more protocols to be among layers in a protocol stack, which typically exist in a hierarchy. One reference model for such a set of seven protocol layers is the OSI model. These seven layers include: a physical layer, data link layer, network layer, transport layer, session layer, presentation layer, and application layer. The physical layer is the "lowest" layer, while the application layer is the "highest" layer. Two well-known transport layer protocols are the Transmission Control Protocol (TCP) and User Datagram Protocol (UDP). A well-known network layer protocol is the Internet Protocol (IP). In the immediately preceding example, a video conference might use the UDP as the transport layer. In this example context, the mapping of the ranked value may occur at the highest (application) layer of the OSI model to an appropriate IP packet (e.g., IP packet prioritization header) before causing the data-communication packets to be conveyed during the data-communications conference via the UDP-specific transport layer protocol.

Accordingly, using the OSI model as a non-limiting specific example, the relevance rank $R_v$ of a video stream v at the application layer is directly mapped to an appropriate IP packet marking at the network layer, so that IP packets of highly relevant video streams are appropriately prioritized at the network layer and, in many specific embodiments, this mapping takes into account one or more constraints which may limit one or more connections involved in conveying the packets for the conference. Setting the IP packet markings of a video stream v based on its rank $R_v$ in this manner may sometimes be referred to herein as relevance-based network queuing prioritization.

As specific practical applications of examples in accordance with the present disclosure, the platforms of assignee 8×8, Inc. (Campbell, California) provide a unique data set to pull from its 8×8-specific application layer to create specific attributes for prioritization of network data (whether using the OSI or another model), wherein the relevance rank of packets for a video stream at the application layer are mapped to an appropriate IP packet marking at the network layer for the relevance-based smart SFU to selectively forward video streams that are most relevant (e.g., and while taking into account such communications-related constraints which may limit one or more connections involving communications of the packets to and/or from the media server). In one example, such mapping may be realized between application layer data and relevance-ranked network data, by modeling and correlation. Modeling can be applied by formatting expected data of application layers (and other layers of the OSI model) and relevance-ranked network data and by later using such a model by evaluating actually received sets of packets associated with a particular conference and applying the formatting of the model (for the mapping of such data) to correlate the application-layer data with relevance rankings from the application layer data to the data of the network layer. In this way, queuing is used for feeding the network layer with an orderly delivery of the data to the conference participants. Such mapping (e.g., modeling and correlating) can also be implemented by code executed to be automatically applied and used in determinations to affect particularly-designated conferences. Further, such modeling can be developed in part by training an algorithm to change an existing model and/or creating a new model, or by a combination of aggregated-data modeling (e.g., wherein an aggregation of related data from previous conferences are used to create and/or develop the modeling).

By the media server monitoring the conferences in real time, each such conference can be contextualized and evaluated in real-time and prioritized sets of packets incoming for the conference can be adjusted on the fly. In this manner and relative to the hub-based configuration of the media server, the conference can be optimized by controlling the incoming (and outgoing) feeds globally (i.e., all meeting participants), with selective control over packets being sent on behalf of each of the individual conference participants or, in some instance, with selective control over packets being sent on behalf of a combination of conference participants (e.g., a group or some participants representing one viewpoint or pertaining to an agenda item or topic of the conference) so as to focus shared subject matter for the conference along the lines of the agenda, in a participant-balanced manner, and/or with certain participants being prioritized meeting participants such as those based on presenting/speaking, title, and/or context of meeting.

The present disclosure is applicable in any user engagement scenario provision of service-based communications across the Internet (e.g., cloud-based communication services). In more specific examples, various aspects of the present disclosure may work in connection with cloud-based communication platforms including those that provide unified communications (e.g., unified communications as a service, 'UCaaS'), contact center communications (e.g., contact center as a service, "CCaaS'), communications platform as a service ("CPaaS"), and/or a combination thereof (e.g., providing a platform which may be referred to as XCaaS (Experience Communications as a Service)). Exemplary communications platforms in this regard include a UC-CC platform (as discussed and exemplified in connection with examples herein such as in FIG. 1) and a XCaaS platform (e.g., the 8×8 XCaaS Platform). Among various specific example implementations, the XCaaS platform is designed to support a vibrant ecosystem of deeply integrated applications or services providing a unified user experience, enabling global communications through a plurality of communication channels, omnichannel interaction orchestration, extensible workspaces, customer interaction data, analytics and reporting, administrative console management of features and functionalities, third-party integrations of apps/services, widgets, etc., and machine learning and artificial intelligences, among other features and functionalities. Notably, ML/AI algorithms can be created, trained and adapted based on unique data sets of cloud-based communication platforms (e.g., XCaaS platform), for example, any data individually or in aggregate of the 8×8 XCaaS Platform to generate contextually relevant real-time (or near real-time) relevance rankings for data routing management during an electronic meeting. This may include data points within the context of an electronic meeting (present and/or historical meeting data for one or more users/participants) as well as any other data points available through the communications platform (including third-party integrations) that may be used to enhance relevance determinations around how to route data during an electronic meeting. Non-limiting examples of data points within the context of a meeting comprise but are not limited to: usage of electronic meeting feature functionality and other capabilities set for or usable by specific meeting participants during a meeting including changes to key features/functionalities (e.g., user camera and/or microphone toggled on/off); whether a participant is a presenter/non-presenter, speaker/non-speaker, screen-sharing, activation of requests (e.g., requests to speak, live stream, emojis, etc.); status of audio/video feeds (e.g., toggled on/off) in an instant or for periods of time; messaging status (e.g., messages sent); recording management; whiteboard control; viewing displays (including tiled view, focus on one/more participants); meeting data analytics (e.g., speaking time, camera time) and performance settings (e.g., buffering) or quality settings (e.g., video quality), among other examples. Non-limiting examples of other data points available through the communications platform comprise but are not limited to: contextual data across omni-channel communication channels (e.g., chat messaging (1:1 and/or group), SMS/MMS, email, electronic meetings (e.g., one or more historic meetings), and contact center queues; user analytics of UCaaS, CCaaS, CPaaS features/functionalities including workforce management (e.g., supervisory management of users such as agents, enterprise resource planning), meeting summaries and contextual meeting analytics; user and/or organizational profile data; user (or customer) relationship management data; technical support/help desk management; administrative portal management (e.g., administrative console); device, application and/or service configurations; stored user data; and AI/ML integrations providing analytics such as sentiment analysis, among other examples.

As simple example, a user may be a passive participant in an electronic meeting with its video and/or microphone turned off while another user is presenting. Applying algorithmic modeling, relevance ranking can determine to deprioritize video and/or microphone streams for that user during that time. Continuing that example, subsequent packets for a similar data stream may be continuously de-prioritized to minimize jitter and latency until a change is detected in the user meeting status (e.g., user turns on its video). This can enable an application/service to prioritize more impactful data packets for overall electronic meeting experience, which can be extremely beneficial for a meeting experience especially when a large number of users are present with many data streams to process. An adapted ML/AI model may be trained to detect a cue in a meeting to re-evaluate prioritization of a data stream (e.g., user video stream) to re-evaluate packet priority and automatically update relevance/prioritization levels to efficiently manage data routing in real-time (or near real-time). In a continued example, the user may have turned off its microphone due to background noise while another user was presenting, but subsequently selects an electronic meeting feature (e.g., raised hand) to indicate the user wishes to speak next in the meeting. Applying algorithmic modeling, relevance ranking can determine to prioritize the microphone stream for that user as subsequent data packets are being processed to make sure other users are receiving that user's audio (while potentially deprioritizing other data packets based on relevance analysis).

In another example, historical contextual meeting data for a user/participant may be analyzed to determine user patterns/behaviors for predictively routing (prioritizing/deprioritizing) data packets. Say a user has historically turned off their camera for the first 5 minutes of each of the last ten meetings, but then historically switched their camera on. This user behavior can be utilized in the relevance ranking to suggest de-prioritization of the user's video stream for the beginning of the electronic meeting and potentially prioritize the video stream for that user at or around the 5-minute mark in the current electronic meeting. This relevance analysis can be combined with signals from the current electronic meeting that the user is attending, for example, a determination as to whether the user's camera is turned off in the electronic meeting, which can be a quick confirmation of relevance analysis. Additionally, or alternatively, a check on the user's video stream can further be queued up at or around the 5-minute mark in an ongoing electronic meeting to see detect if there is a change in the user's camera that may impact prioritization of the user's video stream, for example, based on the historical analysis.

In further example, adapted algorithmic modeling (e.g., ML/AI modeling) may be trained to manage data streams for groups of users in a video conference/electronic meeting in real-time (or near real-time). For instance, groups of data streams can be prioritized or deprioritized based on relevance ranking analysis that can factor in real-time meeting signal data, historical meeting signal data (pertaining to users/participants), as well as contextual data from endpoints of an application/service or software data platform (e.g., XCaaS platform). This can be yet another efficient way that a video conference can be managed when there are a lot of meeting participants and a plurality of data streams to manage. As an example, say a company video conference is being conducted by multiple departments such as a marketing department and a product management department. Signal data from that electronic meeting may be analyzed to determine that marketing is presenting a slide deck to the product management department with multiple users/participants from the marketing department speaking while the slide deck is being presented. Relevance analysis may determine to temporarily prioritize data streams (e.g., video and/or audio) of marketing participants in the electronic meeting and temporarily de-prioritize data streams for the product marketing participants while the presentation is ongoing. As the context changes, relevance ranking may be updated in real-time (or near real-time) to update prioritization levels for data packet routing.

An exemplary communications-service platform, for carrying out aspects of the present disclosure, is illustrated in FIG. 1. FIG. 1 illustrates a block diagram of an example system to show how a data communications system, according to the present disclosure, may receive and process incoming calls (from among data communications 111) and media packets for participating in a certain conference. In this example, the certain conference may be a video conference involving at least several conference participants (e.g., each of which are associated with EPs and some of the EPs being associated with a client entity receiving services from the communications-service platform. For example, an EP (e.g., user-operated data communications device) 105, such as may be used by a customer of a client entity, may send a request to set up a conference via a data network 109 for the client entity via one of the client-specific control engines 119 and with the conference designating various participants identifiable by a contact list which identifies linked smartphones. EP 105 includes circuitry configured and arranged to facilitate data communications with client A, as well as a data-center communications server 101. The user-data communication (e.g., the phone call requesting the setting up of the conference) may be communicated to the client (e.g., communications equipment 103 of Client A) and via a data network 109. The data network may be communicatively coupled to a data-center communications (media) server 101, such as may be provided by a data communications server providing data communications services on a subscription basis.

The user-data communication setting up the conference may indicate the EPs to participate, the configurations for designating who (conference participants, identification data of EPs, etc.), what (e.g., types and volume of information to be shared) and other specifics (e.g., types of terms to monitor as having a possible high relevance for prioritizing that should be pre-designated or otherwise stored information for discerning and mapping priority information passed over as packets received and used by the server 101 for a particular conference). In these contexts, the server 101 includes certain circuitry to store, access and use such information for discerning and mapping the priority information. This certain circuitry is exemplified in FIG. 1 as computer-executable software modules as follows: a module 115 for conference directive provided by the conference moderator, a module 117 for communications-related parameters and constraints, and a module 118 for capturing and/or captured information as to the source of the received packets from each EP, the intonations, content and/or context of the received packets, etc.

Also, once the conference is set up and incoming packets are being received for the conference, such packets may be processed in real time by a monitoring circuit (e.g., implemented as a software module) within the computer circuitry of the data-center communications server 101 to analyze the content, sentiment and criticality of the packets, and the like, and to handle the packets in accordance with rules specified by the moderator (or representative) as in module 115. For example, the rules may be stored in a client specific database for a particular conference and/or for all such conferences related to the client entity (as a default unless changed). The incoming packets may also be analyzed by the data-center communications server 101 with respect to the source of the call (via caller ID information), and with respect to previously-gathered information regarding, for example, recognition of a term in the current conference overlapping with a term of at least one previous conference or call from the same participant as indicated by the caller ID information.

As illustrated in FIG. 1 in connection with multiple client-specific control engines 119, each of the client entities is typically remotely situated from each other and the server 101 and each client entity may be associated with one or more of a plurality of EPs identifiable by the server 101, for which the server 101 includes circuitry configured to facilitate transmission of the data communications services provided by the data communications server 101, including broadcasting and receiving feedback for real time conferences.

As a specific example using the exemplary arrangement of the system of FIG. 1, the server 101 is equipped to carry out a method that involves receiving data-communication packets from a plurality of EPs for a data-communications conference (or meeting), with an accounting for the relevance of the incoming packets for a particular data-communications conference and for system-based communications constraints before assigning and mapping a ranking value to the packets at an application layer of a communications network protocol. The ranking value of the packets at the application layer may then be used to set a priority of the received packets for transmission to the participant(s) of the meeting, for example, by the server 101, with access to instructions provided by a moderator (or by an algorithm) for how to map the incoming packets, for example, received at the application layer, with relevance-based priority for queueing before broadcasting by the media server to the other participants.

In some embodiments, the client managed server 107 and/or the monitoring aspect of the data-center communications server 101 may analyze the speech characteristic parameters of the received packets. As used herein, the speech characteristic parameters refer to or include factors that assist in identifying a sentiment, topic, and/or issue of a particular communication. Speech characteristic parameters may include key words, phrases, a combination of key words and phrases, and/or measurable audio values including a wavelength or velocity of the recorded message, and an amplitude of the recorded message.

The data-center communications server 101 may determine a sentiment score and a criticality score for the message based on the analyzed speech characteristic parameters. The sentiment score, as used herein, refers to or includes a numerical value associated with an overall sentiment of the recorded message. A criticality score refers to or includes a numerical value associated with an overall importance of the recorded message. The sentiment score and the criticality score for a particular message may differ between respective client entities. For instance, a particular sentiment for one client entity may be negative and indicative of a client service issue, whereas the same sentiment for another client entity may be positive and not indicative of a client service issue. Similarly, particular topics, key words, phrases, or combinations thereof may be associated with a highly critical (e.g., important) project for one client entity, and not important or of lesser importance for another client entity. Accordingly, the data-center communications server 101 may be communicatively coupled to a client-specific database 121, and/or a plurality of client specific databases. The client specific database 121 may store correlations for each respective client entity served by the data communications provider, associating key words, phrases, combinations of key words and phrases, and measurable audio values with different respective sentiment scores. Similarly, the client specific database 121 may store correlations for each respective client entity served by the data communications provider, associating key words, phrases, and combinations of key words and phrases, with different respective criticality scores, and these aspects or parameters of the calls may be aggregated and correlated over time according to categories such as: identification (ID) of the callee/caller, specific topic, sentiment type, etc., and then used, based on the conference rules, to adjust priorities of the information to be broadcasted for the conference.

In certain more-particular examples, client entities may specify a threshold range for sentiment scores and a threshold range for criticality scores which trigger respective actions by the data-center communications server. Accordingly, the client specific database 121 may maintain a set of rules associating sentiment scores and criticality scores with various communication handling processes. For instance, one client entity may specify that messages with a sentiment score above a particular threshold, and/or messages with a criticality score above a particular threshold should be prioritized higher than certain other packet received for the conference (e.g., as received from lesser valued EPs). The manner in which each respective set of incoming packets is to be handled may be specified in a client specific database 121. The database may also include customer relationship management data, and context information associated with particular clients among the plurality of remotely-situated client entities.

The data-center communications server 101 and/or the client-managed server 107, may identify a plurality of speech characteristic parameters by analyzing at least one of words and tones of voice communications previously received by the plurality of remotely-situated client entities, and correlating the plurality of speech characteristic parameters with a particular sentiment. The data-center communications server 101 and/or the client-managed server 107 may determine a sentiment by comparing the sentiment of the received message with attributes stored in the client specific database. Similarly, the data-center communications server 101 and/or the client-managed server 107 may determine a criticality by comparing the issue or topic of the received message with attributes stored in the client specific database. In various example embodiments, the data-center communications server 101 and/or the client-managed server 107 may identify a plurality of speech characteristic parameters by analyzing at least one of words and tones of voice communications previously received by the plurality of remotely-situated client entities, and correlating the plurality of speech characteristic parameters with a particular sentiment. In this regard, the data-center communications server and/or the client managed server 107 may identify thresholds delineating ranges for a plurality of sentiment scores, each respective sentiment score including a numerical value associated with an overall sentiment of the recorded message, determined by at least one of a frequency of audio of the recorded message, a wavelength or velocity of the recorded message, and an amplitude of the recorded message. The thresholds delineating the sentiment scores may be dynamic, in that they change over time and are modifiable by the client entity. Machine learning and/or artificial intelligence may implement such threshold determination, such that with added use, the thresholds for sentiment and criticality become more defined with a larger data set.

The data-center communications server 101 and/or the client-managed server 107 may identify a plurality of speech characteristic parameters by analyzing at least one of words and tones of voice communications previously received by the plurality of remotely-situated client entities, and correlating the plurality of speech characteristic parameters with a particular criticality indicative of an overall importance of the recorded message. As such, thresholds may be used to delineate ranges for a plurality of criticality scores, with each respective criticality score including a numerical value associated with an overall importance of the recorded message, that is determined at least in part by key words included in the recorded message.

The data-center communications server 101 may retrieve a set of client-specific communication handling rules associating sentiment scores and criticality scores with communication handling processes. For instance, the client specific database 121 may store rules for each of the different clients served by the data communications provider, directing how communications meeting specific criteria are handled. Additionally, client-specific control engines 119 may specify a manner in which endpoint devices such as communication devices 105, 115-1, 115-2, and 115-3 are controlled, and/or a manner of routing of a data communications for a client account (e.g., an individual or company or other entity registered to receive data communication services from the media server). In various example embodiments, handling of the message based on the sentiment and criticality scores occurs during the recording of the message, and routing the voice communication according to the client-specific communication handling rules. For instance, the recording of the message may be interrupted and the voice communication may be routed to a human operator based on the determined sentiment score or the determined criticality score.

A variety of insights in terms of changing or weighting of priority assignments in such multiparty conferences can be realized by executing AI/ML algorithms with different types of roles in such disclosed example embodiments. As examples, AI/ML algorithms may be executed for carrying out activities such as: decision-making on delivering content from one participant that is in conflict with another participant (e.g., in terms of timing, content, the conference agenda, etc.), changes in relevance ranking for prioritization of delivery of certain data, and updates thereto, generation of insights to certain or all of the conference participants wherein such insights are triggered by sharing of certain pre-designated subject matter that is relevant to certain (e.g., complex) topics, alerts that block certain information from being delivered to certain participants due to the content being sensitive (e.g., as may be discerned historically by the algorithm), prioritizing contextually-relevant data and surfacing such data for presentation during the conference (including during elevated video experience, before/after), and in a general sense, omni-channel orchestration of data.

Such AI/ML algorithms may be integrated directly with the media server via computer-based data-processing circuitry and/or via an extension through a portal to another computer node (e.g., managed by a third party or by the same entity providing the communication services tied to the media server).

Various example embodiments, including one or more of those discussed herein, can be implemented as significant advancements and/or solutions for media routers/servers that combine the techniques of communications models (e.g., different layers of the OSI model via application layer and network layer) to optimize the delivered video quality and optimize quality of service for delivery of content deemed more important than other content. In the above and certain other example embodiments, other technical advantages include optimization of the communications used in network conferences with reports to indicate and improve on how performance was changed to improve the conference experience (e.g., with high availability and reduction in on or more of background noise, jitter, microphone feedback from conference participant(s), etc.). For example, the media server can deliver packets for a conference on a priority basis while making back-end relevance determinations and automatically applying changes to affect a meeting and, in some instances, creating reports on optimization of the communications used in the meeting to indicate how performance improved the conference experience with high throughput and access to the shared materials and other media, and with a high quality of service (e.g., no noise, delays or noticeable jitter).

Figure 2:
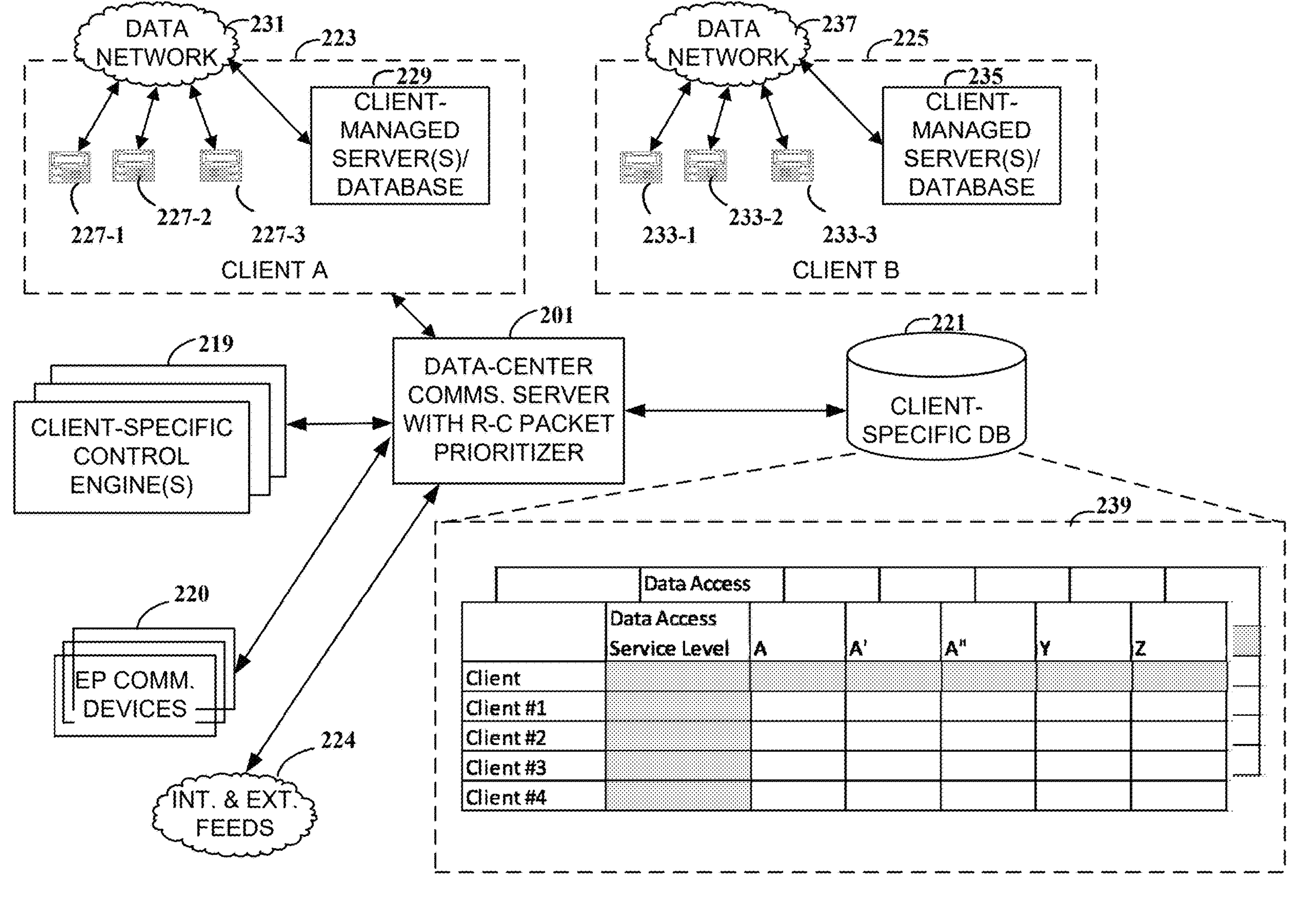
FIG. 2 is another system-level diagram showing another exemplary system useful for carrying out certain aspects of the present disclosure.

Also consistent with the present disclosure, FIG. 2 depicts another example of a computer-implemented system configured for processing received EP communications by monitoring the source, content, and quality of connection of each set of incoming to a data-communications (media) server as depicted by a data communications center server 201 and one or more client-specific control engines 219 which may be implemented at respective client-specific sites and/or in the Cloud. The data center server 201, as depicted, prioritizes the received packets based on their relevance (the "R" of R-C of block 201) to the conference and on an accounting of the constraints (the "C" of R-C of block 201) of the connections to convey the received packets for the conference. This prioritization is realized by generating corresponding relevance-based rankings at the application layer and related actions, consistent with embodiments of the present disclosure.

More specifically in the example system of FIG. 2, the data-center communications server 201 is configured to provide data communications for a plurality of endpoint devices 227-1. 227-2, 227-3, 233-1, 233-2, 233-3, connected in one or more data networks 231 and 237. The EPs may include data communications-enabled devices (e.g., IP phones, smart phones, tablets, and/or desktop computers with appropriate data communications software applications) and/or non-data communications endpoint devices (e.g., plain old telephone service (POTS) telephones and cellular-capable devices). Each EP is respectively associated with an account of a respective client. Endpoint devices may be associated with a particular client account by registering the endpoint device with a particular client account serviced by the data communications server. Registered devices for each client account may be listed in a respective account settings file (not shown) stored by the data-center communications server 201. In this example, endpoint devices 227-1, 227-2, and 227-3 are associated with an account 223 for a first client A and endpoint devices 233-1, 233-2, and 233-3 are associated with an account 225 for a second client B.

The system includes one or more processing circuits configured to implement client-specific control engines 219, which are configured to adjust the data communications provided for each client account according to a respective set of control directives. For instance, the client-specific control engines 219 may adjust a manner in which endpoint devices 227-1, 227-2, and 227-3 are controlled, and/or a manner of routing of a data communications for a client account, by generating client-specific sets of control data to the data-center communications server 201. For example, the client-specific control engines 219 may generate client-specific sets of control data by processing the respective set of control directives for the account in response to communication event data or other data prompts received from the data-center communications server 201.

As previously described, client-specific control engines 219 may be used to facilitate control of endpoint devices associated with a client device. The control of the endpoint devices may be associated with a variety of virtual office features including, for example, data communications services such as VOIP calls, audio and/or video conferencing, IPBX exchange servers, packet switching, and traffic management as well as non-data communications services including, but not limited to, website hosting, remote data storage, remote computing services, and virtual computing environments. One or more of such virtual office features may be provided, for example, by a cloud computing network having one or more servers configurable to provide a data communications system for a plurality of clients.

Each respective client entity may have a client-managed server and/or database. For instance, Client A may be associated with a client managed server or database 229, whereas Client B may be associated with a client managed server or database 235. The client-managed server may facilitate the routing of data communications between the respective endpoint devices and the data-center communications server. Similarly, the client-managed servers may, in some example embodiments, analyze the sentiment and criticality of communications sent to and/or received by the respective endpoint devices, as discussed herein. In some example embodiments, each respective client entity may have a database storing client-specific preferences correlating different sentiment scores and criticality scores with different handling processes.

Other than Client A and Client B EPs, other EPs 220 may communicate with the data-communications call center 201 as may one or more data communications portals for other data feeds, as depicted at 224. The other EPs 220 may be associated with individuals and/or entities which are not necessarily affiliated with one of the client entities (such as Client A and Client B) registered to receive the data communications services. As examples of such other data feeds, the feeds may be external such as local or other urgent news information relevant to the conference or participants, and/or internal such as urgent news specific to the client entity for which the conference or participants are involved.

Consistent with the related discussion herein, the functions associated with the flow depicted in FIG. 2 can be carried out using one or more computer servers, such as the media/monitor server (integrated with computer processing circuitry) as discussed herein in various examples. One or more client-specific control engines (e.g., a set of one or more servers integrated with computer-data-processing circuitry) accesses a client-specific database 221 (e.g., organized specifically on a client-by-client basis to serve one or more clients) which stores lists of EPs 202 along with potential problem sources (e.g., creating quality of service (QoS) issues such as undue levels of noise, jitter, delays, etc.) specific to one or more of the connections associated with each of the incoming/received packets. These potential problem sources may adversely affect connections of a multi-party conference and typically related to problems that may affect at least a few to several different parties and that may involve, collectively, a plethora of network connections (e.g., depending on the network(s) being used and the number of EPs participating in the conference).

For each of the EPs participating in a particular conference, the computer-processing circuitry uses the database 239 to process the relevance of the received packets. The database 239 has a list of entries which can be associated or correlated to one another, as indicated by a connection matrix (columns and rows in the inset of the database 239) to identify each EP and correlate each such EP with one or more of the following attributes: different components in a communication path between the endpoint and an SIP server to which the endpoint is registered, the name of an EP user and the EP user's title, an importance value of the EP user as may be designated by a representative of the client entity or a moderator, key words and contexts used by the EP user which should be discerned by the (monitor/media) server whenever indicated by the conference moderator's (representative's or client entity's) configuration profile for the meeting, or in particular times or conferences involving the EP user. Other entries and correlations, as exemplified herein, may also be included in the database 221.

According to various embodiments, the potential problem sources can specify sources according to responsible entities. For example, a business entity that has a number of VoIP endpoint devices at an office location might be identified as a problem source and an ISP provided might be identified as another problem source. This level of specificity can be particularly useful when the monitor server does not have knowledge of the specific configuration and devices that are part of the interconnected communications system(s) of the client entity or client entities. The corresponding threshold triggers and actions/notifications can therefore be implemented at the client-entity level.

In certain embodiments of the present disclosure, the potential problem sources can specify, in their conveyance of data, particular components in a communication path between the endpoints and the (media) server. For instance, the potential problem sources might include an error message with an ID data of an EP to identify and associate the EP as being a problem with communications at a wireless access point, a device providing a firewall, configuration of devices with respect to a Network Address Translation (NAT) router, a modem, a Domain Name System (DNS) server, and one or more routers. In this manner, the specificity of the particular communication path can be more clearly identified and analyzed relative to EPs which are designated to participate in each particular multi-party conference.

According to certain embodiments, the SIP servers can also be included in the list of potential problem sources. For example, a large subgroup could include all endpoints registered to a particular SIP server. If the SIP server becomes unavailable or exhibits connectivity problems, then endpoints from across the large subgroup might be affected. Rather than sending out notifications to many different entities corresponding to the affected endpoints, the monitor server can be configured to first provide a notification to an entity that is responsible for maintaining the SIP server.

A probabilistic determination can then be made for each of the possible or likely (i.e., candidate) problem sources specified as being associated with each set of received data packets. In certain embodiments, the result can be a probability that each of the potential problem sources (pertaining to the connection issue or network communications problem) is causing one or more of the problems identified in the problematic data sourced at or received by each EP participating in the multi-party conference. In some cases there may be multiple different problems associated with a single potential problem source. For example, some endpoints associated with a potential problem source might report call quality issues while other endpoints associated with the same potential problem source might be identified as having lost connectivity with an SIP server. In some instances, an algorithm (e.g., as part of an artificial-intelligence computer-data-processing circuit coupled to the media server), could be configured to calculate a separate likelihood for each set of endpoints and associated problem. Depending upon the configuration for the trigger thresholds, each of these separate likelihoods might have a different trigger threshold level, or they could be aggregated and the result compared to a trigger threshold level.

In some instances, such an algorithm can be configured to integrate the data from the different problems into a single probability determination. For instance, the algorithm can be configured to determine the probability that the particular combination of problematic endpoints, with the different respective problems, would occur due to a problem with each potential problem source. As an example, a firewall configuration problem might be expected to manifest itself with loss of connectivity for endpoints blocked by the firewall, but not with call quality problems. Conversely, a data bandwidth issue might be expected to have call quality problems, and if the problem is extreme, also with loss of connectivity. Appropriate actions can then be generated and as specified in one or more action profiles.

Consistent with some embodiments, the probabilistic determination can take into consideration known status changes for groups of endpoints and for specific customer infrastructure. These status changes can be added to a pool of problem sources and a probability distribution can be created. For example, a potential problem source might be generated when endpoints receive a software update. Historic data and predictions on likely issues that can arise can be accounted for by such an algorithm and used to develop the probability distribution. The entity responsible for the software updates can be added into the action profile along with the desired action (e.g., email notification). A similar procedure can be implemented in response to known changes to an entities system. Such data output by the algorithm can be correlated to a table of weighting values and applied to each set of received data packets (e.g., as discussed in various embodiments herein such as in connection with FIGS. 3A and 3B).

In other instances, the monitor server (e.g., as part of a filtering algorithm), can be configured to proactively and automatically identify anomalies based upon metadata for the endpoint devices and potential problem sources. For instance, the monitor server can compare metadata from problematic endpoints to find commonalities related to the list of potential problem sources linked to the connections used by the EPs participating in the conference. The server can also compare the metadata from problematic endpoints to the EPs that do not exhibit connectivity problems to identify differences between the problematic and non-problematic endpoints. Such processing can occur in real time during the conference. As one example, the metadata might specify the software version and configuration for each endpoint device, which might be useful for identifying a specific software version that is causing a problem, or for identifying a problematic configuration for certain endpoints, such as the use of a particular port that might not be open in a firewall. This information can then be included in the notifications to assist in troubleshooting any problems.

Figures 3A, 3B:
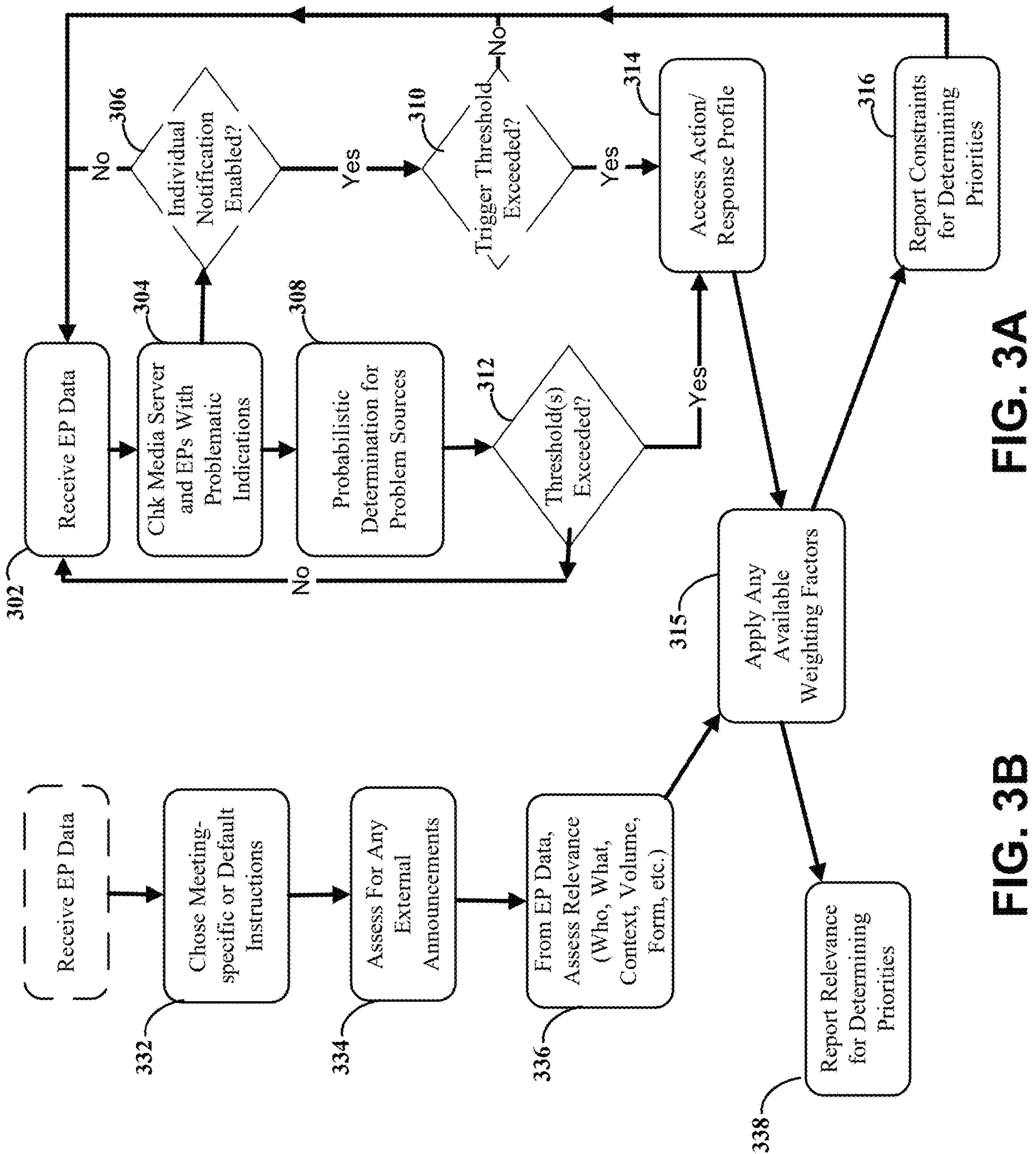
FIGS. 3A and 3B are interconnected portions of a flow diagram showing one example manner of carrying out certain aspects of the present disclosure.

Consistent with certain example embodiments of the present disclosure, a flow diagram set is depicted with two parts, respectively in FIG. 3A and in FIG. 3B, for activities or operations carried out by a computer processing circuitry coupled to a set of one or more server (e.g., a Cloud-based server set, or simply "server"). The server includes a media server and, in certain examples the media server also depicts, includes or acts as a SIP (session initiation protocol) server and/or monitor server. According to various embodiments, endpoint data (via user-endpoint devices, "EPs") are associated with a particular multi-person (or multi-party) conference, which in turn is typically associated with at least a few to several designated or active participants.

In this above exemplary context, the right side (FIG. 3A) of the flow diagram (pertaining to assessing system constraints) is addressed first, followed by the left side (FIG. 3B) of the flow diagram which pertains to assessing relevance. At the right side (FIG. 3A), an active participant connection is established between the EP and the media server (or more generally, "server"), and the connection for each EP is typically associated with potential problems which can be received by the server, as depicted in block 302. The SIP server manages SIP calls on a network via an application-layer control protocol that allows for the creation, modification, and termination of real-time communication sessions for the multi-party conferences (e.g., voice, video, instant messaging, multimedia distribution, and multimedia conferences). The monitor server (e.g., integrated at least communicatively with the media server) is configured to monitor the connections of the participants EPs involved in the multi-party conference for assessing quality of service (QoS issues and/or parameters such as jitter, delays, noise, etc.) and for discerning important (e.g., high-priority-related) aspects linked to the meeting. Discerning important items for the multiparty conference may be realized in various ways, such as discussed herein in connection with " " (FIG. 3B).

This data from the each of the multiple EPs can be received at the media server, and the media server can also receive data from other data sources (e.g., external sources such as third party feeds to alert participants of important news items relating to the context or topics of the conference). For example, EPs can report call quality to their assigned SIP server (e.g., using and sending a SIP publish message), which can send the data on to the media server. The EPs can also be configured to provide call quality data directly to the media server. In another example, the endpoint statuses (e.g., as indicated by SIP registration messages) can be provided from the SIP servers to the monitor server. In some instances, the endpoint devices can be configured to send a notification directly to the media server if the endpoint device is unable to connect with the assigned SIP server.

The aspects of the server set corresponding to the monitor server can use the data to parse the pool of endpoint devices based upon the endpoint devices with problematic indications and their associated subgroups, per block 304. For instance, the monitor server can be configured to parse endpoints based upon call quality data by identifying call quality that is below a minimum threshold or upon a failed receipt of an expected registration communication. The monitor server can then determine what subgroups the endpoint is within.

In certain embodiments, the monitor server can be configured to provide notifications to individual users of endpoints. For example, an individual might have a VoIP endpoint device at their home or office. The monitor server can check each parsed endpoint to see whether or not the individual notification option is enabled for that endpoint, per block 306. If not, the individual notification process ends until additional user endpoint (EP) data is received, per block 302. If the individual notification option is enabled for any of the endpoints, the monitor server can determine whether or not a trigger threshold/level is exceeded, per block 310. If not, then the individual notification process ends until additional endpoint data is received, per block 302. If a trigger threshold is exceeded, then the monitor can access an action/response profile to determine which individual to contact, per block 314. With the trigger threshold being exceeded, the related connection is marked with a certain "weighting" of the problematic connection (e.g., on a scale from a most-severe level to a least-severe level) for consideration by the media server in prioritizing input feeds for the multi-party conference. This weighting of the problematic connection is depicted at block 315. The appropriate action (e.g., a notification message) can then be performed when appropriate for a given example embodiment, per block 316. Consistent with various embodiments, the action/response profile can also specify different manners in which to contact the individual depending upon the type of problem. For instance, an individual may not wish to be contacted via email if the likely source of the problem is that the individual's Internet connection is not functioning properly. The server is then equipped with sufficient data to select between corresponding contact methods for reporting purposes at block 316.

In various embodiments, the server set (e.g., media/monitor server) can be configured to make probabilistic determinations for problem sources corresponding to the parsed endpoint devices involved in the multi-party conference, per block 308. For example, the monitor server can be configured to determine the likelihood that various potential problem sources have an issue with their functionality. The monitor server can then determine whether or not a corresponding trigger threshold is exceeded, per block 312. This can include, for example, comparing the determined probability to a threshold probability level. As discussed herein, there can be multiple trigger thresholds for each problem source and each trigger threshold can correspond to a different indicated problem (e.g., call quality and connectivity loss). If the trigger threshold is not exceeded, then the monitor server can wait for more endpoint data to be received, per block 302. If the trigger level is exceeded, then the monitor server can access an action/response profile and perform the appropriate action, per blocks 314, 315 and 316 and as discussed in more detail herein. For instance, an action profile can be stored in a database or memory circuit that is accessible by the monitor server.

In certain embodiments, a monitor server can be further configured to correlate status information of individual(s) associated with endpoint device(s) to further characterize potential problems. For example, the online presence of a device connected on the same network as the endpoint may signify that the problem is with the endpoint device itself. In some embodiments, the monitor server can access profile information for the individual to identify alternative devices likely to be located on the same network as the endpoint device. The monitor server can then attempt to contact one or more of these devices.

Referring back to the top left of the flow diagram, FIG. 3B provides an example flow, among many, for how the server assesses conference packets (from each of the conference-participating EPs) for prioritization. The first block of FIG. 3B is shown in dotted lines as this block may be implemented as corresponding to block 302 of FIG. 3A, at which juncture the monitor server awaits and receives data from the conference-participating EPs. From block 302 of FIG. 3A, flow proceeds to block 332 of FIG. 3B where the server selects pre-stored instructions for assessing priorities for the conference. In this example, such instructions may be instructions provided specifically for the meeting (meeting-specific instructions) and/or default instructions, each depicted in block 332. Meeting-specific instructions may be provided by a representative of the client entity, moderator, initiator, etc., of the meeting (generally referred to as "representative"), and such meeting-specific instructions may be applicable from meeting to meeting until changed by the representative. These instructions are used to indicate pre-assigned priority levels to each set of packets from the various EPs to be used by conference participants (e.g., EPs associated with senior officers of company (as may be specified by names and/or titles) being the most important, EPs associated with non-senior officers of company being next most important, followed by outside consultants, then EP(s) associated with the representative, then non-senior officers, long-term employees, employees with the client entity less than 5 years etc.). Further, key words, intonation, topic and/or context discerned in the received packets by the monitor server may also be identified in the instructions to designate a high-level priority. For any particular conference, the above examples are but a few of the many types of priority levels that may be provided and pre-stored for use during the meeting.

The default instructions may be set up with the received packets corresponding to input directly from the representative of the client entity, moderator, and/or conference initiator as the most important communicator and then with received packets corresponding to any documents shared by the EP(s) of such representative(s) as next most important packets.

Also, as may be useful for either the initial default instructions or the meeting-specific instructions, a template may be set up and used by the service provider, a client entity, or a conference moderator (e.g., representative) to identify the types of packets to be assessed with certain respective priorities (e.g., relatively high priority) and to identify the sources (e.g., names, titles, and identification numbers associated with the received packets) used in identifying the types of packets to be assessed with certain respective priorities.

Referring back to FIG. 3B, from block 332, flow proceeds to block 334 to assess or check for any special alerts or communications (aka "announcements") worthy of trumping the relative priority-level designations. Such announcements may be provided from a source or external party linked into the meeting by the moderator or other conference representative. Processing of such announcements may be implemented as an interruption of the meeting with a broadcast of the announcement to all (or a selected number) of the participants, and this may be indicated in the pre-stored instructions, by a table or by an algorithm (AI/ML) which learns and/or predicts based on previous conferences, instructions provided by others, etc.

From block 334, flow proceeds to block 336 where the server actively assesses (in real or near real time) the received EP data to assess their relevance (or importance) in response to the pre-stored instructions (block 332) and/or the processing of any announcements (block 334). Consistent with the above discussion concerning the pre-stored instructions, when packets are received from each such participating EP, the server recognizes the source of the packets and correlates that source with the pre-stored instructions for assessing the relevance to be assigned to such packets. This relevance assessment step occurs at block 336. If the example embodiment has the server processing the packets to discern (e.g., by transcription, an algorithm (AI/ML), etc.) context, topic, recognize voice, key words, and the like, for assessing the relevance, then this also occurs at block 336.

From block 336, flow proceeds to block 315 where the server applies any weighting factors effectively to offset or bolster the assessed relevance to be assigned to such packets as carried out at block 336. Such weighting can take into account the information provided by blocks 310, 312 and 314 pertaining to the quality of service (QoS) of one or more of the connections used by the EPs. For example, an assessed very high relevance may have been assigned to certain packets as carried out at block 336 but the QoS for the connection carrying the received packets may be extremely poor. In this instance, the server may change the assessed very high relevance for the received packets to a lower level of relevance.

It should be appreciated that the constraints could be used for weighting the assigned levels of relevance, and/or the assigned levels of relevance could be used for weighting the constraints. In these contexts, the server can be configured to use status information about the participant to determine the appropriate way or degree at which to weight the connection. As examples, this weighting might take into account different parameters associated with the EP-linked participant such as the extent to which the EP-linked participant has been recently active, whether the EP-linked participant is designated for the conference as a moderator, an officer (at a certain level) of the entity related to the topic(s) (or contexts) of the conference, and whether the EP-linked participant is discerned (e.g., by AI/ML) as being an observer, an important person or a very important person, etc. The server is then equipped with sufficient data to discern how to prioritize packets (e.g., video packets) and, in example implementations in which reporting is to occur.

After applying any weighting factors at block 315, flows proceeds to block 338 where the relevance ranking of the packets (e.g., $R_v$ of a set of packets in a video stream v as previously discussed) at the application layer is directly mapped to an appropriate IP packet marking at the network layer, thereby appropriately prioritizing, at the network layer, IP packets that are highly relevant to the conference (e.g., video streams as the case may be in certain specific example embodiments). With the weighting at block 315 accounting for one or more connection-related constraints, the highly-relevant IP packets may be prioritized such that the IP packet markings of a communications (e.g., video) stream are intelligently processed for relevance-based network queuing prioritization so that the conference avoids (or mitigates) system-communications-related interference of such streams due to such connection-related constraints.

Furthermore, aspects of the present disclosure are directed to systems and methods that implement trained AI processing to further contemplate other types of signal data that may be collected through various host applications/services (e.g., pertaining to a software platform). For instance, application of trained AI processing (e.g., one or more trained machine learning models) may be adapted to evaluate not only data and data sources integrating with an exemplary UX for assessing and serving operational opportunities, but other types of contextual data including past and/or current user actions, user preferences, application/service log data, etc., that are each associated with one or more users, entities, systems and/or endpoint devices. This additional signal data analysis may help yield determinations as to how (and/or when) to generate updated analytics (in real-time or near real-time) and/or reporting, as well as when and how often to present data insights and/or suggestions.

Non-limiting examples of signal data that may be collected and analyzed includes but are not limited to: device-specific signal data collected from operation of one or more user computing devices; user-specific signal data collected from specific tenants/user-accounts with respect to access to any of: devices, login to a distributed software platform, applications, services, etc.; application-specific data collected from usage of applications/services and associated endpoints (including third-party endpoints integrated within a software platform), data collected from disparate software platforms that provide disparate types of operational opportunities; or a combination thereof. Analysis of such types of signal data in an aggregate manner may be useful in helping generate contextually relevant determinations, data insights, etc. Analysis of exemplary signal data may comprise identifying correlations and relationships between different types of signal data specific to user usage of one or more software data platforms (e.g., communications software platforms), where telemetric analysis may be applied to generate determinations with respect to a contextual state of user activity with respect to different host application/services and associated endpoints. Analyzing of signal data, including user-specific signal data, may occur in compliance with user privacy regulations and policies.

In some examples, one or more components are configured to manage application of one or more AI models to enhance processing described in the present disclosure ("AI" being used interchangeably with AI/ML). Trained AI processing is applicable to aid any type of determinative or predictive processing including specific processing operations described with respect to determinations, classification ranking/scoring and relevance ranking/scoring. An exemplary component for implementation trained AI processing may manage AI modeling including the creation, training, application, and updating of AI modeling. Trained AI processing may be adapted to execute specific determinations described herein including those for analyzing specific data and data sources of a software data platform (e.g., a communications software platform) and/or generating insights for data augmentation. For instance, an AI model may be specifically trained and adapted for execution of processing operations pertaining to analyzing features and functionality of an XCaaS offering including those non-limiting examples previously described. Non-limiting examples of AI implementation include but are not limited to: analyzing data (and metadata) associated with one or more software platforms including third-party integrations; generating contextual determinations for improving user experience, access to opportunities across disparate platforms (and for example rating or ranking such opportunities), performance, efficiency including contextual determinations for improving account access with respect to servicing opportunities, suggesting utilization of certain opportunities, and/or integrations including third-party integrations to enhance access; prioritization of opportunities, actions, etc. to improve workflow and processing. Exemplary AI processing may be applicable to aid any type of determinative or predictive processing by any components of the present disclosure, via any of: learning for curating displays, learning for prioritizing opportunities, and learning for manners in which to assess and/or present respective opportunities, among other examples. In one example, trained AI processing comprises a hybrid AI model (e.g., hybrid machine learning model) that is adapted and trained to execute a plurality of processing operations described in the present disclosure. In alternative examples, trained AI processing comprises a collective application of a plurality of trained AI models (e.g., 3 trained AI models) that are separately trained and managed to execute processing described herein. In alternative examples, the present disclosure extends to integrating third-party AI modeling and further adapting and customizing said AI modeling to work with specific data and data sources of an exemplary software platform. For example, a third-party AI model may be adapted to work with a communications software platform including data, data sources, and integrations (e.g., APIs, web hooks, etc.) related to XCaaS features and functionality. In examples where a plurality of independently trained and managed AI models is implemented, downstream processing efficiency may be improved by an ordered application of trained AI models where processing results from earlier applied AI models can be propagated to subsequently applied AI models. For example, a trained AI model may evaluate opportunities and derive data correlations to improve processing and efficiency including suggestions for reallocation of resources and/or prioritizing of opportunities, which may then be utilized to suggest a re-prioritization of opportunities (and/or reallocation of resources as may be appropriate) to improve efficiency and quality of services provided.

Accordingly in certain examples including an AI/ML algorithm, data communications systems and/or platforms may be implemented according to the present disclosure by having an AI/ML algorithm adapted for specific use as part of a data-communications a service to be provided by the media server. In one such example implementation, the adapted AI/ML algorithm is executed at least in part to influence or alter the assigning of a ranking value in real-time or near real-time. In another such example implementation, the adapted AI/ML algorithm is executed at least in part to discern contextually relevant information associated with the data-communication packets and, in response, to influence or alter in real-time or near real-time at least one of: the mapping of the ranking value, and the assigning of the ranking value. In one or more of these instances, the adapted AI/ML algorithm is executed (e.g., to discern contextually relevant information) based on input data that is from resources associated with the data-communication packets. As non-limiting examples, such resources may include one or more of: data that identifies one of the participants (or the party on behalf of which the caller communicates), recognition of language corresponding to pre-stored trigger words such as one or more topics, agendas, keywords and/or phrases.

Non-limiting examples of supervised learning that may be applied comprise but are not limited to: nearest neighbor processing; naive bayes classification processing; decision trees; linear regression; support vector machines (SVM) neural networks (e.g., convolutional neural network (CNN) or recurrent neural network (RNN)); and transformers, among other examples. Non-limiting examples of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting examples of semi-supervised learning that may be applied comprise but are not limited to: assumption determination processing; generative modeling; low-density separation processing and graph-based method processing, among other examples. Non-limiting examples of reinforcement learning that may be applied comprise but are not limited to: value-based processing; policy-based processing; and model-based processing, among other examples. Furthermore, a component for implementation of trained AI processing may be configured to apply a ranker to generate relevance scoring to assist with any processing determinations with respect to any relevance analysis, such as that described herein. Scoring for relevance (or importance) ranking may be based on individual relevance scoring metrics described herein or an aggregation of said scoring metrics. In some examples where multiple relevance scoring metrics are utilized, a weighting may be applied that prioritizes one relevance scoring metric over another depending on the signal data collected and the specific determination being generated. Results of a relevance analysis may be finalized according to developer specifications. This may comprise a threshold analysis of results, where a threshold relevance score may be comparatively evaluated with one or more relevance scoring metrics generated from application of trained AI processing.

It is recognized and appreciated that as specific examples, the above-characterized figures and discussion are provided to help illustrate certain aspects (and advantages in some instances) which may be used in the manufacture of such structures and devices. These structures and devices include the exemplary structures and devices described in connection with each of the figures as well as other devices, as each such described embodiment has one or more related aspects which may be modified and/or combined with the other such devices and examples as described hereinabove.

The skilled artisan would also recognize various terminology as used in the present disclosure by way of their plain meaning. As examples, the Specification may describe and/or illustrates aspects useful for implementing the examples by way of various semiconductor materials/circuits which may be illustrated as or may use terms such as layers, blocks, modules, device, system, unit, controller, and/or other circuit-type depictions. As other examples, reference to a noun in the singular refers to one from among one or more of, unless otherwise indicated (e.g., "a packet" in various contexts is the same as referring to "at least one packet"), and reference to "example" is not intended to be limiting (e.g., "example" and "non-limiting example" are synonymous). Also, in connection with such descriptions, the term "set of . . . " (e.g., set of servers) refers to a set of one or more such items (e.g., servers), and the term "conference" (and synonymously "meeting") refers to a multiparty conference involving at least a few or at least several participants to the conference and in which packets from the conference participants are being processed through a data communications server (e.g., media server). Such aspects and circuit elements and/or related circuitry may be used together with other aspects to exemplify how certain examples may be carried out in the form or structures, steps, functions, operations, activities, etc. It should be understood that the terminology is used for notational convenience only and that in actual use the disclosed structures may be oriented and/or ordered different from the orientation or ordering shown in the figures. Thus, the terms should not be construed in a limiting manner.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed:

1. A method comprising:

receiving, at a media server, data-communication packets from a plurality of user-operable endpoints in a data-communications conference;

assigning a ranking value (P) from among possible ranking values ($P_1$-$P_N$) including at least one higher value and a plurality of lower values, based on (1) a determined relevance (R) of one of the data-communication packets from one of the plurality of user-operable endpoints and (2) one or more constraints (C) associated with the data-communications conference, to the one of the data-communication packets received from the one of the plurality of user-operable endpoints, wherein the ranking value (P) is based on a mapping as a function of R and C in accordance with the relationship P: $R \times C \rightarrow \{P_1, \ldots P_N\}$; and mapping the ranking value at an application layer of a communications network protocol to an appropriate packet at a network layer, wherein the act of mapping causes the one of the data-communication packets to be conveyed during the data-communications conference with more urgency than other ones of the data-communication packets respectively received from other ones of the plurality of user-operable endpoints.

2. The method of claim 1, wherein the data-communication packets are received via the application layer of the network communication protocol, and wherein the method further includes mapping the received data-communication packets from the application layer to the network layer of the network communication protocol.

3. The method of claim 1, further including conveying the one of the data-communication packets during the data-communications conference via user datagram protocol (UDP) type data transfer protocol.

4. The method of claim 1, further including discerning the determined relevance of the one of the data-communication packets by at least two or more of: (1) context, (2) emotion or sentiment, or (3) one or more keywords in one or more of the received data-communication packets.

5. The method of claim 1, further including discerning the determined relevance of the one of the data-communication packets based on an input data derived from communications that are internal to the data-communications conference or from an external feed provided from a source outside of the data-communications conference.

6. The method of claim 1, further including weighting the determined relevance of the one of the data-communication packets from the one of the plurality of user-operable endpoints based on the one or more constraints associated with the data-communications conference.

7. The method of claim 1, further including weighting the one or more constraints associated with the data-communications conference based on the determined relevance of the one of the data-communication packets from the one of the plurality of user-operable endpoints.

8. The method of claim 1, wherein the one or more constraints associated with the data-communications conference comprise communications-related constraints of the media server and of the different ones of the plurality of user-operable endpoints.

9. The method of claim 1, wherein the one or more constraints comprise: jitter, bandwidth of the media server, bandwidth of at least one of the different ones of the plurality of user-operable endpoints, or two or more of any of the foregoing.

10. The method of claim 1, further comprising using an artificial-intelligence and/or machine-learning (AI/ML) algorithm to influence or alter the assigning of the ranking value in real-time or near real-time.

11. The method of claim 1, further comprising using an artificial-intelligence and/or machine-learning algorithm to influence or alter in real-time or near real-time at least one of: the mapping of the ranking value, and or the assigning of the ranking value.

12. The method of claim 1, further comprising changing the ranking value based on an event that occurred in the data-communications conference.

13. The method of claim 1, wherein the determined relevance (R) of the one of the data-communication packets is determined by identifying an event that occurs during the data-communications conference.

14. An apparatus comprising:

a media server to receive data-communication packets from a plurality of user-operable endpoints in a data-communications conference; and computing-processor circuitry, linked with the media server, and configured to assign a ranking value (P) from among possible ranking values ($P_1$-$P_N$) including at least one higher value and a plurality of lower values, based on (1) a determined relevance (R) of certain of the data-communication packets of from one of the plurality of user-operable endpoints and (2) one or more constraints (C) associated with the data-communications conference, to different sets of the one of the data-communication packets respectively received from different ones the one of the plurality of user-operable endpoints, wherein the ranking value (P) is based on a mapping as a function of R and C in accordance with the relationship P: $R \times C \rightarrow \{P_1 \ldots P_N\}$; and map the ranking value at an application layer of a communications network protocol to an appropriate packet at a network layer, wherein the mapped ranking value causes the one of the data-communication packets to be conveyed during the data-communications conference with more urgency than other ones of the data-communication packets respectively received from other ones of the plurality of user-operable endpoints.

15. The apparatus of claim 14, wherein the computing-processor circuitry is configured to discern at least one of: the determined relevance of the one of the data-communication packets of one of the plurality of user-operable endpoints, and or the one or more constraints associated with the data-communications conference.

16. The apparatus of claim 14, wherein the computing-processor circuitry is configured to discern the determined relevance of the one of the data-communication packets by at least two or more of: (1) context, (2) emotion or sentiment, or (3) one or more keywords in one or more of the received data-communication packets.

17. The apparatus of claim 14, wherein the computing-processor circuitry is configured to discern the determined relevance of the one of the data-communication packets by a computer-executed algorithm that predicts the determined relevance.

18. The apparatus of claim 14, wherein the computing-processor circuitry is configured to discern the determined relevance of the one of the data-communication packets based on an input data that is derived from communications that are internal to the data-communications conference or from an external feed provided from a source outside of the data-communications conference.

19. For use with a media server that is to receive data-communication packets from a plurality of user-operable endpoints in a data-communications conference, a data communications system comprising:

computing-processor circuitry configured to:

analyze content of the received data-communication packets;

discern a determined relevance of one of the data-communication packets from one of user-operable endpoints based on the analyzed content;

assign a ranking value (P) from among possible ranking values ($P_1$-$P_N$) including at least one higher value and a plurality of lower values, based on (1) a determined relevance (R) of the one of the data-communication packets of from the one of the plurality of user-operable endpoints and 2) one or more constraints (C) associated with the data-communications conference, to the one of the data-communication packets received from the one of the plurality of user-operable endpoints, wherein the ranking value (P) is based on a mapping as a function of R and C in accordance with the relationship P: $R \times C \rightarrow \{P_1, \ldots P_N\}$; and map the ranking value at an application layer of a communications network protocol to an appropriate packet at a network layer, wherein the mapped ranking value causes the one of the data-communication packets to be conveyed during the data-communications conference with more urgency than other ones of the data-communication packets respectively received from other ones of the plurality of user-operable endpoints.

20. The data communications system of claim 19, wherein the computing-processor circuitry is configured to change the ranking value based on an event that occurred in the data-communications conference.

* * * * *